Nov. 28, 1950     L. C. CARLSON     2,531,840
ADAPTER
Filed Aug. 5, 1947
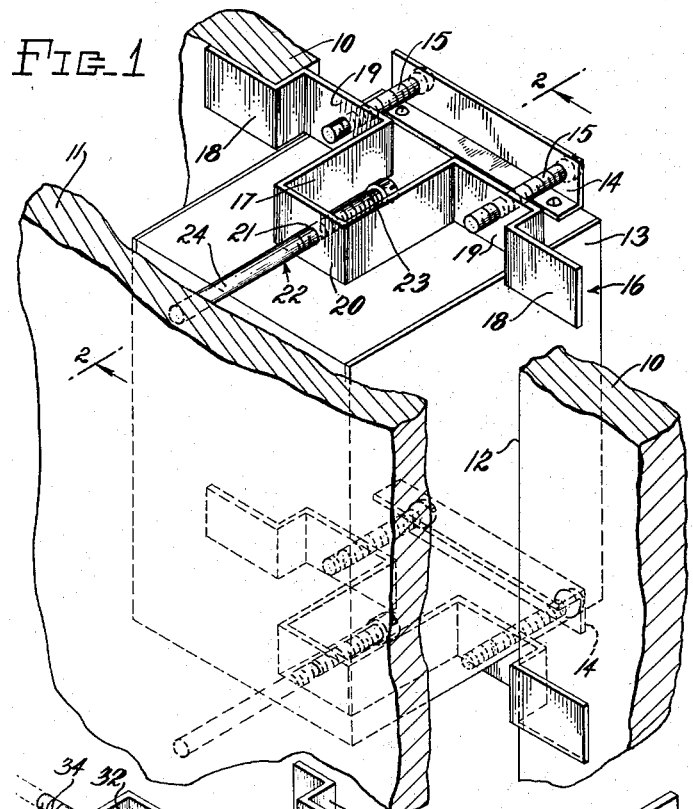
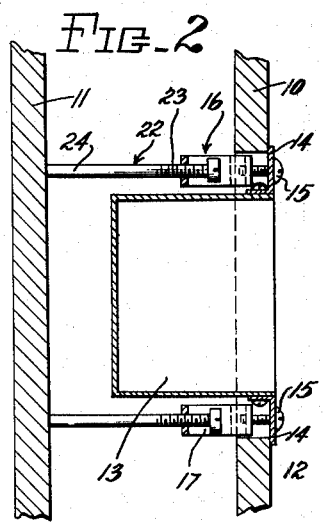
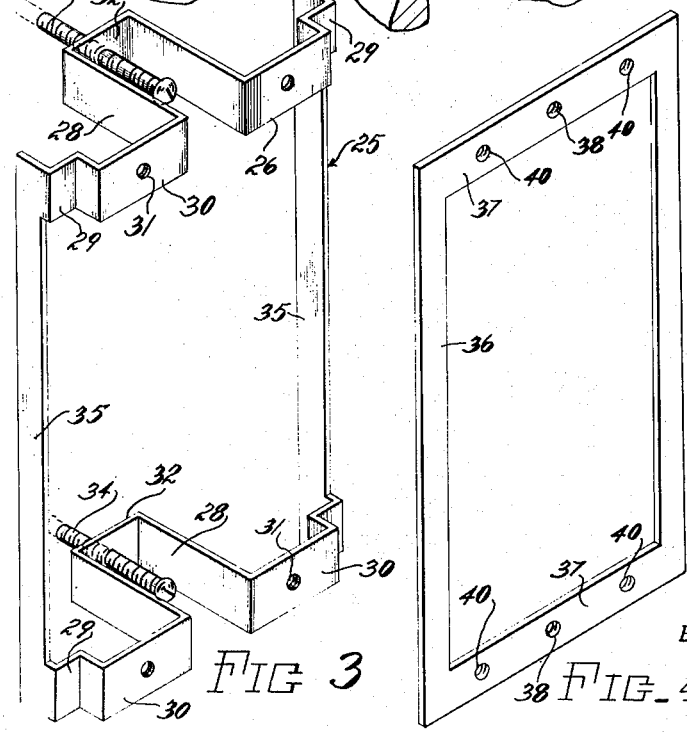
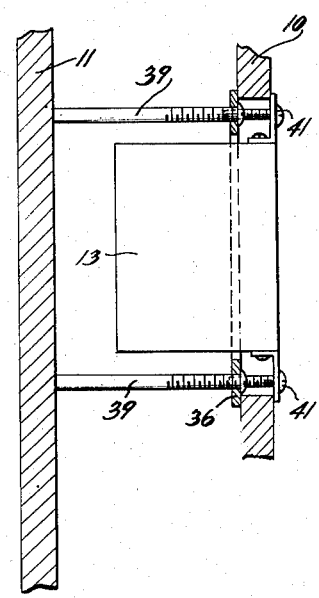
INVENTOR.
LOUIS C. CARLSON
BY John J. Tyrrel
ATTORNEY Patented Nov. 28, 1950

2,531,840

UNITED STATES PATENT OFFICE 2,531,840

ADAPTER

Louis C. Carlson, South Ozone Park, N. Y.

Application August 5, 1947, Serial No. 766,201

5 Claims. (Cl. 248—205)

This invention relates to adapters or support means for mounting an electrical outlet box in a space between the walls of a structure.

In mounting of electrical outlet boxes or other control implement housings between the spaced walls of a structure difficulty has been encountered in the mounting of the box because the back wall is inaccessible and the mounting of the box must be done at the front wall. Devices have been tried that go around the back of the box and these are unsatisfactory because different ones must be used for different sizes of boxes. In these types, the adjusting screws are inaccessible for handling with the fingers because of the confined area in which the holder is mounted and in order to overcome these objections I have made use of a holder which may be jammed into position at either or both ends of the box to be mounted so that ready access is afforded in adjusting the holding means and one which is adaptable to all conditions of application.

An important object of the invention is to provide support means in the nature of strips or frames which permit of mounting boxes of any depth; one which will be adaptable to walls of uneven contour; one which will be strong, of simplified construction and low cost of manufacture and which can be put in place to support a box from either or both ends depending upon the requirements and conditions met with in the mounting of the box, and one which requires little time and effort on the part of the mechanic employing the same.

This application is a continuation-in-part of my copending application Serial No. 573,288, filed January 17, 1945, for Adapter, now Patent No. 2,473,051.

With these and other objects in view, the invention comprises certain constructions hereinafter described and then particularly pointed out in the claims and preferred embodiments of my invention are illustrated in the accompanying drawing, in which:

Figure 1 is a view in perspective showing the use of the adapter in mounting a connection box in the space between two walls, Figure 2 is a section reduced in size, taken on the line 2—2 of Figure 1 and showing the relative positions of the adapters and the box supported thereby, Figure 3 is a view in perspective showing the modified form of the adapter shown in Figure 1 in the shape of a rectangular frame within which the box fits, Figure 4 is a view in perspective of a flat rectangular open frame adapter of modified type, and Figure 5 is a section in plan view through a wall, similar to that shown in Figure 2, showing the mounting of the frame of Figure 4 therein.

Referring to the drawing in detail, 10 and 11 indicates front and rear walls or panels, respectively of a building or other structure, in an opening 12 of the front wall of which, it is desired to mount an electrical wiring connection or outlet box 13, or other housing such as the ones used in thermostat controls. The standard type box 13, of varying depths, is provided with upper and lower brackets or ears 14 through which screws 15 are threaded to connect the box to one or more box supporting, similarly shaped yoke strips or adapters 16 as shown in Figures 1 and 2. Under usual conditions one strip 16 will be used at each upper and lower end of the box, but sometimes a beam is so located that the brackets 14 at either end of the box may be connected directly thereto, in which instance only one yoke strip need be employed. The yoke strip 16 is shaped to provide a central depressed or well portion 17, wall engaging end shoulders 18 flanking said well portion and box supporting bar portions 19 intermediate each of said shoulders and the well.

The bottom 20 of said well has a threaded opening 21 through which passes a jamming screw 22 having a threaded portion 23 and an unthreaded end 24, the latter of which may be cut to the approximate length desired to abut the back wall and force the shoulders 18 of the yoke into jamming relation with the inside surface of the front wall adjacent the opening therein. The depth of the well provides a leeway for the approximate cutting off of the unthreaded shank of the screw 22 so that a workman is not put to the necessity of measuring the space between the walls accurately in applying the adapter.

In the form of the invention shown in Figure 3, a rectangular frame 25 is used for loose fit about the box 13 and whose opposite ends 26 are each shaped to provide forms closely approximating the shapes of the yoke strips 16, in that each presents a central well 28, flanking wall engaging shoulders 29 and box supporting strip portions 30 intermediate said shoulders 29 and the well 28. The portions 30 have threaded openings 31 through which box mounting screws may be threaded to support the box in place in the open frame between the ends thereof. The bottoms 32 of the wells are each provided with a threaded opening for the adjustable passage of a jamming screw 34 which is the same as screw 22 and acts to jam the shouldered portions 29 of the frame 25 securely against the back of the front wall 10. The side edges 35 of the frame may be flat or may be turned at right angles to the plane of the intermediate strip portions 30 for the purpose of stiffening the frame and preventing distortion thereof.

As shown in Figures 4 and 5 use is made of a flat rectangular frame 36 of strip stock having in each of the upper and lower reaches thereof 37 a central threaded opening 38 for a jamming screw such as 39 through the medium of which the frame may be securely jammed against the inner surface of the front wall 10 to support, in the threaded openings 40, disposed at opposite sides of said holes 38, the box 13 as by screws 41.

It is evident that the frames used may be passed through the wall opening and then be readily manipulated into place for jamming engagement with the wall, the shoulders 29 of the frame shown in Figure 3 bearing against the wall to provide a contact area of small dimensions so that the frame will seat squarely on an uneven wall surface, it being evident that the forward edges of the sides 35 thereof are below the plane of said shoulders 29, and do not contact the wall at the sides of the frame.

It is evident also that in the form of the invention shown in Figures 1 and 2 that the shouldered end portions could be straight. While they provide a self centering feature for the positioning of the yokes, they would be usable if the ends were straight to provide wall engaging ends.

My invention is not to be restricted to the precise details of construction shown since various changes and modifications may be made therein without departing from the scope of the invention or sacrificing the advantages derived from its use.

What I claim is:

1. A device for mounting an electrical outlet box or the like in an opening in one of spaced front and back walls comprising a strip member having a central well portion, shoulders at the edges of said member for engagement with the inner surface of the front wall adjacent the opening, supporting bar portions intermediate said well and the shoulders, said well portion being provided with a threaded opening, a jamming screw adjustably mounted in said threaded opening of the well for engagement with the back wall to jam the shoulders against the front wall adjacent the opening whereby the strip member may be positioned in substantially coplanar bridging relation with the opening adjacent one end thereof, and threaded openings in said bar portions for receiving outlet box supporting screws.

2. A device of the character set forth in claim 1 in which the jamming screw is unthreaded in part of the shank portion thereof for quick jamming adjustment.

3. A device for mounting an electrical outlet box or the like in an opening in one of spaced front and back walls comprising a strip member constituting an open rectangular frame form, the opposite ends of which are each shaped to provide a central well portion having a threaded opening, shouldered portions flanking said well portion and bar portions intermediate the well and said shouldered portions, screws in said well openings for engagement with the back wall to force said strip member into jamming engagement with the inside face of the front wall and peripherally of said wall opening and threaded openings in said bar portions for receiving outlet box supporting screws.

4. A device for mounting an electrical connection box or the like in an opening in one of spaced front and back walls comprising strip means having a plurality of threaded openings therein to some of which a connection box or the like may be connected by screws, an elongated screw carried in one of said openings for engagement with the back wall to jam the strip against the face of the front wall at opposite sides of and adjacent to the upper end of said opening and in substantially coplanar bridging relation therewith, a well portion at the center of said strip in which said jamming screw is positioned and said well portion corresponding to an allowable severing tolerance in adjusting the length of said elongated screw to the space separating the walls.

5. A device for mounting an outlet box or the like between closely spaced walls one of which has an opening for receiving the box, comprising strip means having wall engaging portions and extending across the opening in substantially coplanar relation therewith, jamming means in said strip means and adjustable for engagement with the opposite wall to hold the strip forcibly against the wall and threaded openings in the strip means for mounting an outlet box thereon.

LOUIS C. CARLSON.

REFERENCES CITED

The following references are of record in the file of this patent:

UNITED STATES PATENTS

| Number | Name | Date |
|---|---|---|
| 1,453,017 | Lindelof | Apr. 24, 1923 |
| 2,297,862 | Bachmann | Oct. 6, 1942 |